(12) United States Patent
Tanaka

(10) Patent No.: US 7,644,196 B2
(45) Date of Patent: Jan. 5, 2010

(54) USB FUNCTION APPARATUS WHICH SUPPORTS A PLURALITY OF USB DESCRIPTORS

(75) Inventor: Hiroshi Tanaka, Asaka (JP)

(73) Assignee: Fujifilm Corporation, Tokyo (JP)

(*) Notice: Subject to any disclaimer, the term of this patent is extended or adjusted under 35 U.S.C. 154(b) by 427 days.

(21) Appl. No.: 10/925,951

(22) Filed: Aug. 26, 2004

(65) Prior Publication Data
US 2005/0060447 A1  Mar. 17, 2005

(30) Foreign Application Priority Data
Aug. 29, 2003 (JP) ............................. 2003-306981

(51) Int. Cl.
　　*G06F 3/00*　　(2006.01)
　　*G06F 13/12*　　(2006.01)
　　*G06F 13/40*　　(2006.01)
　　*G06F 13/36*　　(2006.01)
(52) U.S. Cl. ..................... 710/19; 710/72; 710/307; 710/310; 710/36; 710/40
(58) Field of Classification Search ................... 710/36, 710/62, 72
See application file for complete search history.

(56) References Cited

U.S. PATENT DOCUMENTS 6,373,854 B1 *  4/2002  Lee ............................. 370/466

| | | | |
|---|---|---|---|
| 2002/0040412 A1* | 4/2002 | Estakhri et al. | 710/11 |
| 2002/0101515 A1* | 8/2002 | Yoshida et al. | 348/211 |
| 2002/0103952 A1* | 8/2002 | Thompson et al. | 710/104 |
| 2003/0212841 A1* | 11/2003 | Lin | 710/62 |

FOREIGN PATENT DOCUMENTS

| | | |
|---|---|---|
| JP | 2000-202325 A | 7/2001 |
| JP | 2001-222503 A | 8/2001 |
| JP | 2002-359810 A | 12/2002 |

OTHER PUBLICATIONS

Enhanced Host Controller Interface Specification forUniversal Serial Bus, Mar. 12, 2002, Revision 1.0, p. 28.*

* cited by examiner

*Primary Examiner*—Henry W. H. Tsai
*Assistant Examiner*—Juanito C Borromeo
(74) *Attorney, Agent, or Firm*—Birch, Stewart, Kolasch & Birch, LLP

(57) ABSTRACT

The present invention provides a USB function apparatus which supports a plurality of USB descriptors and which is connected to a host apparatus via a USB to operate as a USB function, the USB function apparatus comprising a descriptor switching device which switches one of the plurality of USB descriptors to be transmitted to the host apparatus, a bus reset generating device which generates a bus reset to initialize communications with the host apparatus, and a control device which, when a descriptor request from the host apparatus is responded with a current USB description but if the host apparatus does not start communications in accordance with the USB descriptor, causes the descriptor switching device to switch the USB descriptor and causes the bus reset generating device to generate a bus reset.

13 Claims, 9 Drawing Sheets

USB FUNCTION APPARATUS WHICH SUPPORTS A PLURALITY OF USB DESCRIPTORS

This Non-provisional application claims priority under 35 U.S.C. § 119(a) on Patent Application No(s). 2003-306981 filed in Japan on Aug. 29, 2003, the entire contents of which are hereby incorporated by reference.

BACKGROUND OF THE INVENTION

1. Field of the Invention

The present invention relates to a USB function apparatus, and in particular, to a USB function apparatus which supports a plurality of USB descriptors.

2. Description of the Related Art

A USB function apparatus has been proposed which supports a plurality of USB descriptors corresponding to a plurality of functions. With this apparatus, if a user selects one of the plurality of functions, the USB descriptor corresponding to the function selected by the user is transmitted to a USB host apparatus (see Japanese Patent Application Publication No. 2001-202325). For example, if a camera (USB function apparatus) has a mass storage class function (which allows the camera to be treated as an external storage device) and a still image class function (that allows the camera to transfer each still image), when the user selects the mass storage class function on the camera, the USB descriptor representing the mass storage class function is transmitted to a personal computer (USB host apparatus) via a USB.

Another USB function apparatus has been proposed with which a USB host apparatus transmits a vendor-unique command to the USB function apparatus to request a descriptor to be switched. Upon receiving the vender-unique command, the USB function apparatus switches the USB descriptor to be transmitted to a USB host to one assumed by the USB host apparatus (see Japanese Patent Application Publication No. 2001-222503). For example, a personal computer (USB host apparatus) is assumed to correspond only to a mass storage class function. A camera (USB function apparatus) connected to the personal computer via a USB is assumed to have the mass storage class function and a still image class function. Then, when the personal computer transmits a vendor-unique command to the camera, the descriptor transmitted by the camera to the personal computer is switched to the USB descriptor representing the mass storage class function.

SUMMARY OF THE INVENTION

According to Japanese Patent Application Publication No. 2001-202325, when the corresponding function of the USB host apparatus differs from the function selected by the user on the USB function apparatus, even if the USB function apparatus transmits the USB descriptor to the USB host apparatus, subsequent communications between the USB host apparatus and the USB function apparatus are not started. For example, the personal computer (USB host apparatus) is assumed to correspond only to the mass storage class function. The camera (USB function apparatus) connected to the personal computer via the USB is assumed to have the mass storage class function and the still image class function. Then, when the user selects the still image class function on the camera, the personal computer and the camera are connected together by a USB cable. Then, the camera cannot be operated even when it transmits the USB descriptor representing the still image class function to the personal computer.

According to Japanese Patent Application Publication No. 2001-222503, if the USB function apparatus cannot interpret the vendor-unique command (requesting the USB descriptor to be switched) because, for example, the USB host apparatus and the USB function apparatus are from different vendors, even when the USB host apparatus and the USB function apparatus are connected together via the USB cable, the USB descriptor in the USB function apparatus is not switched to the USB descriptor assumed by the USB host apparatus, that is, the USB descriptor corresponding to the configuration of the USB host apparatus. Consequently, the USB function apparatus cannot perform any operation.

In view of these circumstances, it is an object of the present invention to provide a USB function apparatus which supports a plurality of USB descriptors and which ensures communications with a USB host apparatus when connected to the USB host apparatus.

To accomplish this object, a first aspect of the present invention provides a USB function apparatus which supports a plurality of USB descriptors and which is connected to a host apparatus via a USB to operate as a USB function, the USB function apparatus comprising a descriptor switching device which switches one of the plurality of USB descriptors to be transmitted to the host apparatus, a bus reset generating device which generates a bus reset to initialize communications with the host apparatus, and a control device which, when a descriptor request from the host apparatus is responded with a current USB description but if the host apparatus does not start communications in accordance with the USB descriptor, causes the descriptor switching device to switch the USB descriptor and causes the bus reset generating device to generate a bus reset.

With this configuration, when the host apparatus does not start communications in spite of the current USB descriptor transmitted in response to the descriptor request (also referred to as the "descriptor read request") from the host apparatus, the control device of the USB function apparatus switches the USB descriptor to generate a bus reset. It is thus possible to ensure communications between the USB host apparatus and the USB function apparatus.

A second aspect of the present invention is the first aspect, further comprising a host connection detecting device which detects that the host apparatus is connected to the USB function apparatus via the USB, and a timer which starts clocking when the host connection detecting device detects that the host apparatus is connected to the USB function apparatus or when the bus reset generating device generates a bus reset, and wherein when the host apparatus doses not start communications in accordance with the current USB descriptor within a predetermined time after the detection of the connection with the host apparatus or after the generation of a bus reset, the control device switches the USB descriptor to generate a bus reset.

A third aspect of the present invention is the first aspect, further comprising a descriptor request detecting device which detects a USB descriptor request from the host apparatus, and a timer which starts clocking when the descriptor request detecting device detects the descriptor request from the host apparatus, and wherein when the host apparatus doses not start communications in accordance with the current USB descriptor within a predetermined time after the detection of the descriptor request from the host apparatus, the control device switches the USB descriptor to generate a bus reset.

A fourth aspect of the present invention is the first, second, or third aspect, further comprising a descriptor switching setting device which sets whether or not to use the descriptor switching device to switch the USB descriptor.

This configuration makes it possible to set whether or not to automatically switch the USB descriptor. A fixed descriptor is transmitted if the USB descriptor is not set to be automatically switched.

A fifth aspect of the present invention is the first, second, third, or fourth aspect, further comprising a priority setting device which sets priorities for the plurality of USB descriptors in responding to the host apparatus, the USB descriptors being switched by the descriptor switching device.

In the present invention, meaning of terms about USB is based on USB standard and specification.

The present invention provides a USB function apparatus which supports a plurality of USB descriptors and which can ensure communications with a USB host apparatus when connected to the USB host apparatus.

DETAILED DESCRIPTION OF THE PREFERRED EMBODIMENTS

With reference to the drawings, description will be given of preferred embodiments of a USB function apparatus according to the present invention.

First Embodiment

The application of the present invention to a camera will be described below. The camera is connected to a USB host such as a personal computer (hereinafter simply referred to as a "PC") or a printer via a USB (Universal Serial Bus) to operate as a USB function.

Figure 1:
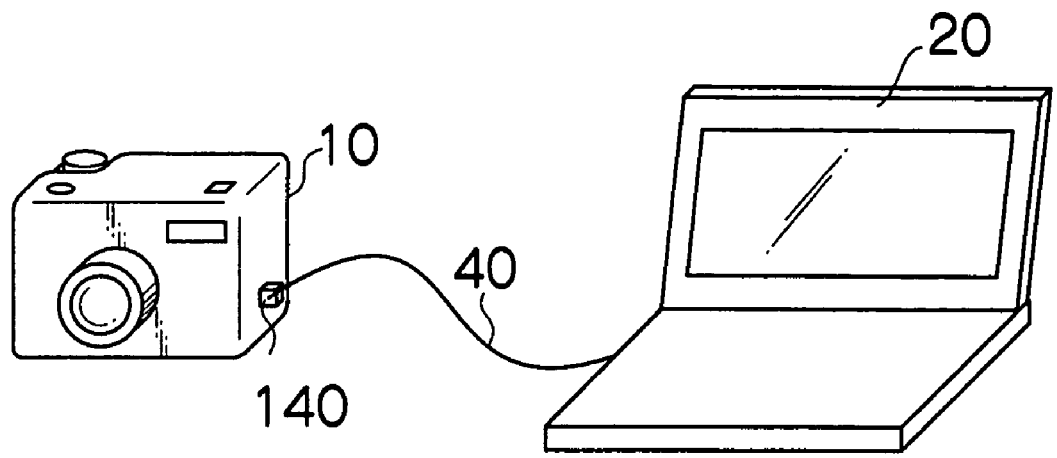
FIG. 1 is a view showing a connection between a camera to which the present invention is applied and a personal computer operating as a host apparatus.

FIG. 1 shows how a camera 10 is connected to a PC 20 via a USB cable 40. In FIG. 1, the PC 20 functions as a USB host, and the camera 10 operates as a USB function of a mass storage class (MSC). Specifically, the camera 10 functions as an external storage device for the PC 20, operating as a USB host. If the PC 20 operates as a USB host and the camera 10 operates as a USB function for a PC camera, the camera 10 consecutively transfers images being photographed to the PC 20 as motion pictures.

Figure 2:
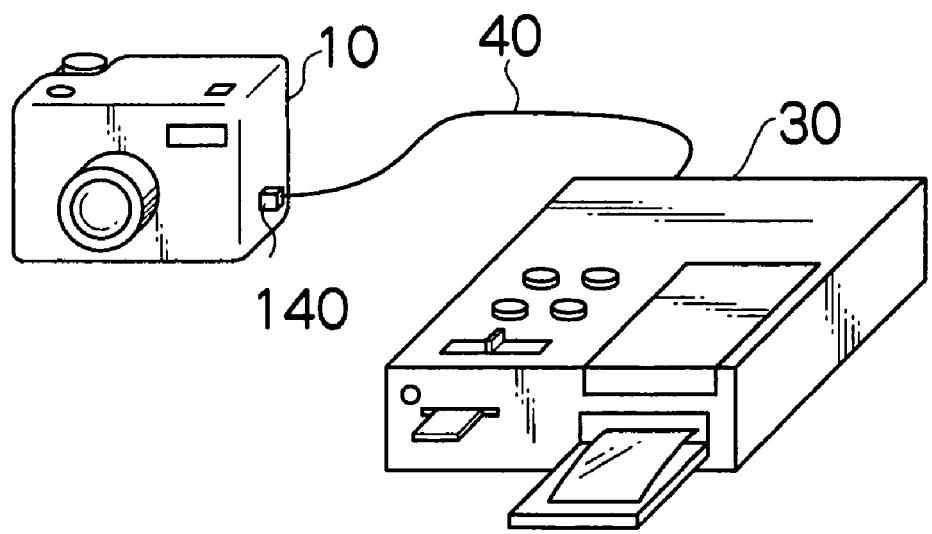
FIG. 2 is a view showing a connection between the camera to which the present invention is applied and a printer operating as a host apparatus.

FIG. 2 shows how the camera 10 is connected to a printer 30 via the USB cable 40. In FIG. 2, the printer 30 operates as a USB host and the camera 10 operates as a USB function of a still image class (SIC). Communications between the printer 30 and the camera 10 via the USB are carried out as the still image class. If the camera 10 operates as the USB function of the still image class, when the user uses a user interface (a liquid crystal display device and operation switches described later) of the camera 10 to instruct on selection and printing of an image, the image in the camera 10 is transferred directly to the printer 30 in response to the user's operation. Then, the printer 30 prints the transferred image. That is, direct printing is carried out.

Figure 3:
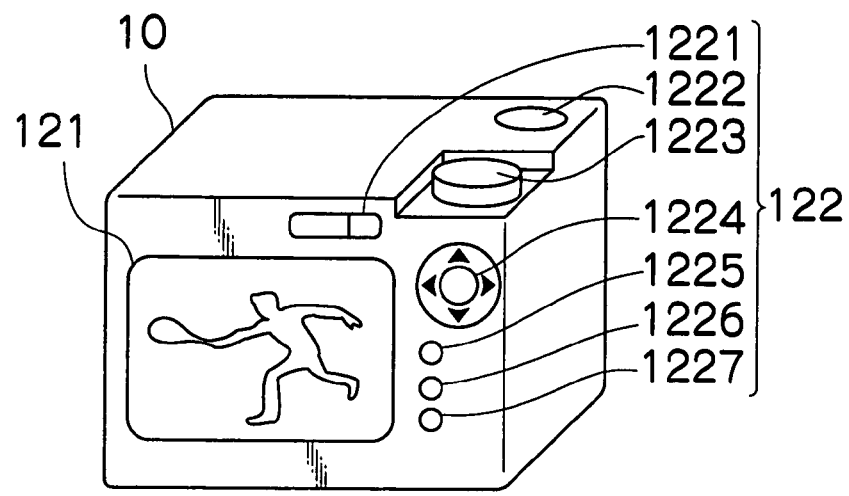
FIG. 3 is a view showing the appearance of the camera to which the present invention is applied.

FIG. 3 is a perspective view of the camera 10 as viewed from its rear surface. A body of the camera 10 is provided with a liquid crystal display device (LCD) 121, and operation switches 122 such as a power switch 1221, a release button 1222 used to input a photographing instruction, a mode dial 1223 used to set any of various modes, a cross button 1224 composed of an up, down, left, and right arrow keys, a menu button 1225 used to instruct on display of a menu, an execution button 1226 used to start executing a predetermined process, and a cancel button 1227 used to cancel a predetermined process.

Figure 4:
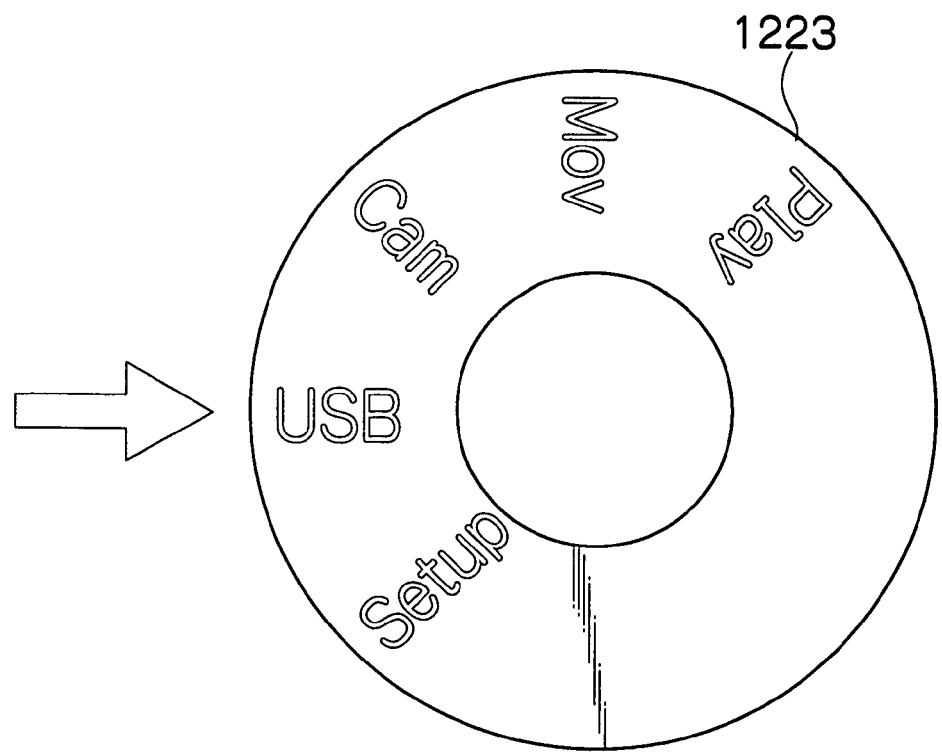
FIG. 4 is a view showing an example of a mode dial in the camera.

FIG. 4 shows an example of the mode dial 1223 in FIG. 3. The mode dial 1223 in FIG. 4 enables the setting of a setup mode that allows various settings to be made, a USB mode that allows communications with the USB host, a still image photographing mode that allows still images to be photographed and recorded, a motion picture photographing mode that allows motion pictures to be photographed and recorded, and a reproduction mode that allows recorded images to be reproduced. In FIG. 4, the USB mode is set to a dial position (the position of the arrow in the figure). In the USB mode, the camera 10 can communicate with the PC 20 or the printer 30 via the USB.

Figure 5:
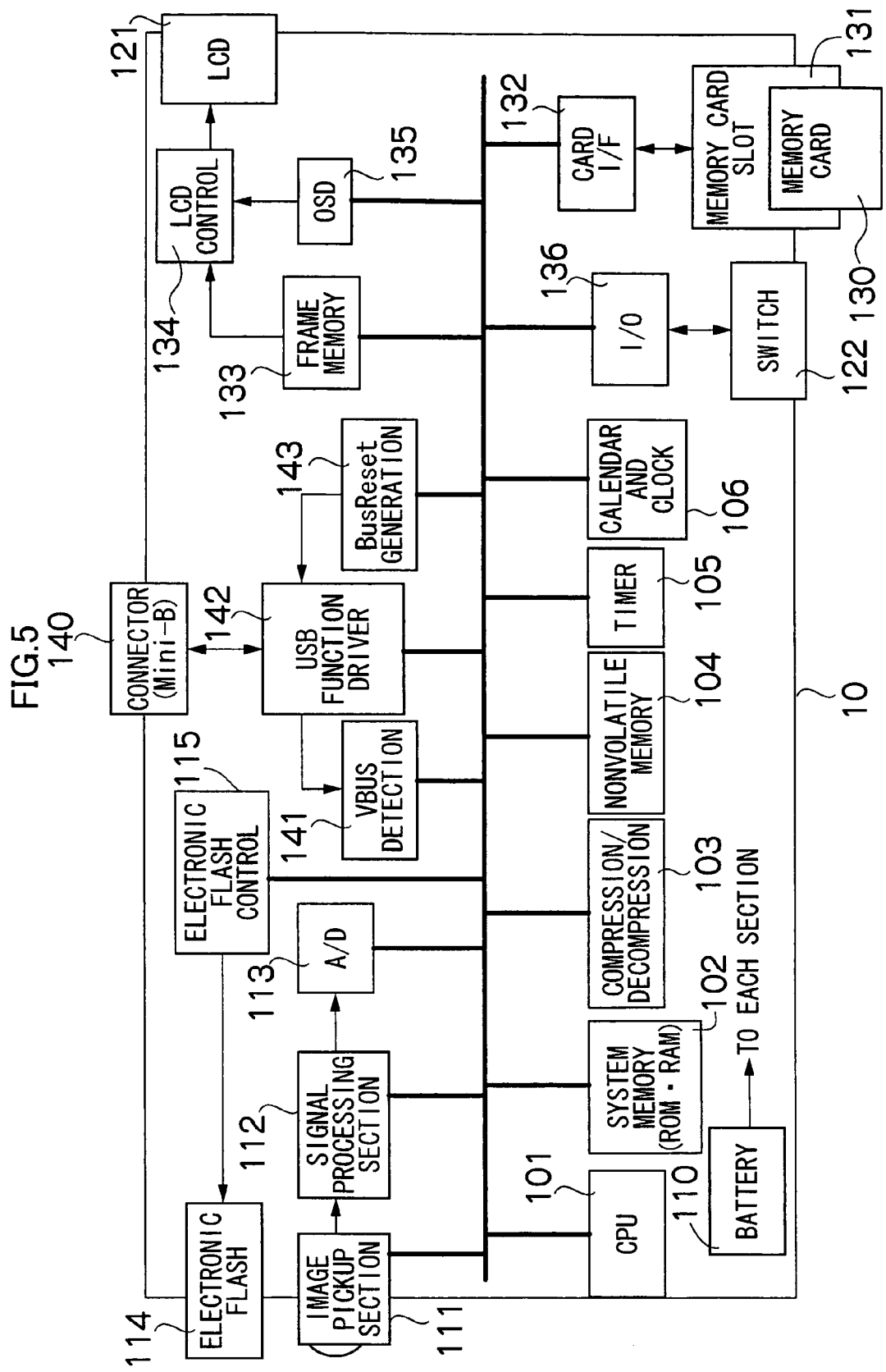
FIG. 5 is a block diagram showing the internal configuration of the camera operating as a USB function apparatus according to a first embodiment of the present invention.

FIG. 5 is a block diagram showing the internal configuration of essential parts of the camera 10.

A central processing unit (CPU) 101 functions as a control device which controls each section of the camera 10 in accordance with a predetermined program. A system memory 102 is composed of a ROM in which programs, various constants, and the like are stored and a RAM which is used as an operation area when a program is executed and in which image data can be temporarily stored. A compression and decompression section 103 compresses and decompresses image data. A nonvolatile memory 104 stores various pieces of setting information including that on the USB. A timer 105 counts a predetermined time. A calendar and clock 106 manages year, date, and time. A battery 110 supplies power to each section of the camera 10.

An image pickup section 111 forms an image from an object on a light receiving surface to subject the image to a photoelectric conversion. The image pickup section 111 outputs the resulting image signal. A signal processing section 112 subjects the image signal outputted by the image pickup section 111, to a predetermined signal process. An A/D converting section 113 converts the resulting analog signal into a digital signal. The digital signal is temporarily stored in the RAM in the system memory 102 as image data. Further, an electronic flash 114 emits light as required under the control of an electronic flash control section 115. The CPU 101 or the like subjects the image data temporarily stored in the RAM in the system memory 102, to a predetermined image process.

The compression and decompression section 103 then compresses the resulting image data using a predetermined technique represented by a JPEG (Joint Photograph Expert Group) standard or the like. The data is then recorded, via a card interface 132, in a memory card 130 installed in a memory card slot 131.

The operation switches 122 are used by the user to input various instructions or settings. The inputted information is communicated to the CPU 101 via an input/output (I/O) circuit 136.

The LCD 121 can display images. Specifically, the image data is read, via the card interface 132, from the memory card 130, installed in the memory card slot 131. The compression and decompression section 103 then decompresses the read data using the predetermined technique represented by the JPEG standard or the like. The decompressed data is temporarily stored in the frame memory 133 and then displayed on the LCD 121 under the control of an LCD control section 134. The LCD 121 can display letters and icons in addition to images under the control of an OSD (On Screen Display) control section 135. The OSD control section 135 executes a data conversion required to display letters and icons on the LCD 121. For example, the LCD 121 can display a setup screen using letters and icons when the mode dial 1223 is used to set the setup mode. The contents of settings in the setup screen are stored in the nonvolatile memory 104.

One end of the USB cable 40 is inserted into the connector 140. The other end of the USB cable is inserted into a connector (not shown) to the USB host. Since the camera 10 operates as the USB function, the USB connector 140 is composed of a mini-B connector.

A VBUS detecting section 141 monitors a VBUS for the USB to detect whether or not the USB host is connected to the USB function apparatus. Specifically, when one end of the USB cable having the other end connected to the USB host is inserted into the connector 140, it is possible to detect that the USB host has supplied the VBUS to the USB function apparatus.

A USB function driver 142 allows the camera 10 to communicate with the USB host via the USB as the USB function. The USB function driver 142 communicates various commands received from the USB host, to the CPU 101. The USB function driver 142 also informs the CPU 101 whether or not a descriptor read request has been received from the USB host.

The USB function driver 142 is also adapted so that the CPU 101 sets the USB descriptor corresponding to the descriptor read request from the USB host, in the USB function driver 142. Upon receiving the USB descriptor read request from the USB host, the USB function driver 142 sends the USB descriptor (current USB descriptor) set by the CPU 101, to the USB host. If the USB function driver 142 thus automatically responds to the descriptor read request from the USB host, it is possible to omit processes executed by the CPU 101 to check the descriptor read request and to respond with the result of the check.

A bus reset generating section 143 generates a bus reset required to initialize communications with the host apparatus. A specific manner of a bus reset is to temporarily stop a D+ signal line of the USB which is normally pulled up, when a bus reset is to be generated.

The manner of counting executed by the previously described timer 105 includes increment and decrement as is well known. Once the timer 105 finishes counting a predetermined time, the CPU 101 detects a timeout.

In the present embodiment, when the VBUS detecting section 141 detects that the USB host is connected to the USB function apparatus, the timer 105 starts clocking and the CPU 101 detects a timeout. Additionally, when bus reset is generated by the bus reset generating section 143 with the USB host connected to the USB function apparatus, the timer 105 also starts clocking and the CPU 101 detects a timeout.

Figure 6:
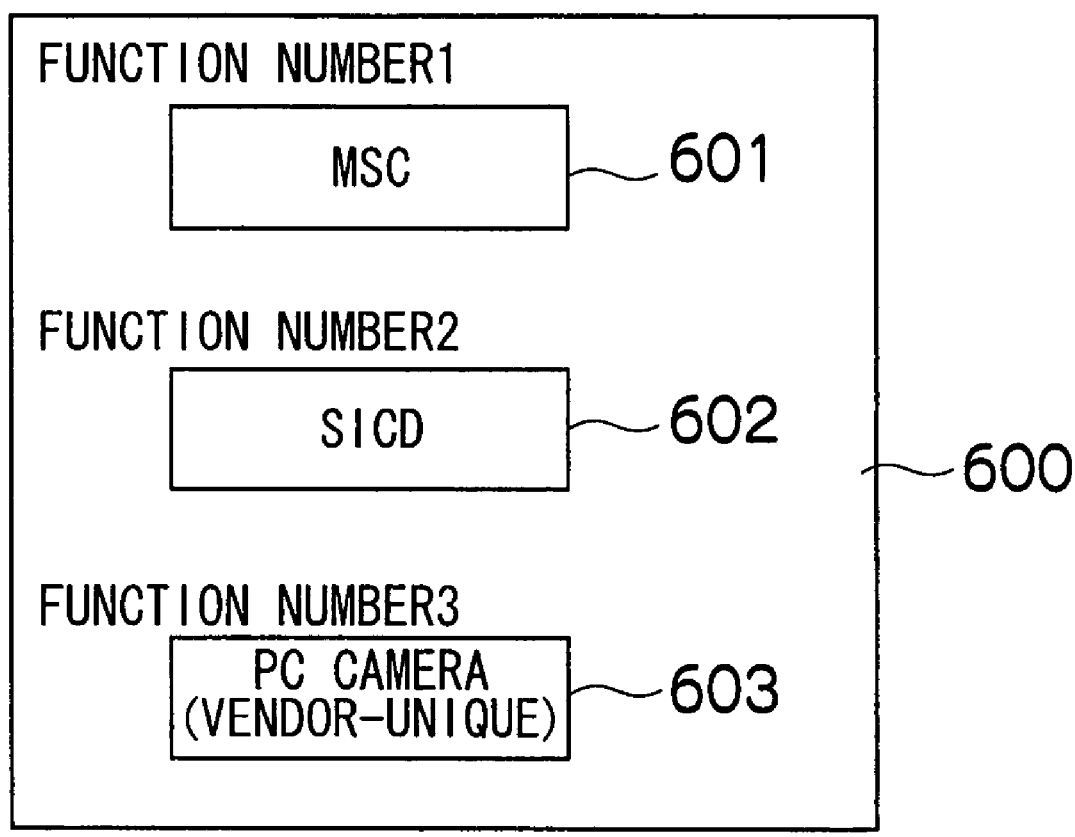
FIG. 6 is a diagram showing a list of descriptors.

FIG. 6 is a list of USB descriptors prestored in the ROM of the system memory 102. The CPU 101 reads one of the USB descriptors registered in this USB descriptor list, from the ROM of the system memory 102, as required, and then sets it in the USB function driver 142. Each USB descriptor is provided with a function number. A function number 1 corresponds to a mass storage class (MSC), a function number 2 corresponds to a still image class (SIC), and a function number 3 corresponds to a vendor-unique PC camera.

Figure 7:
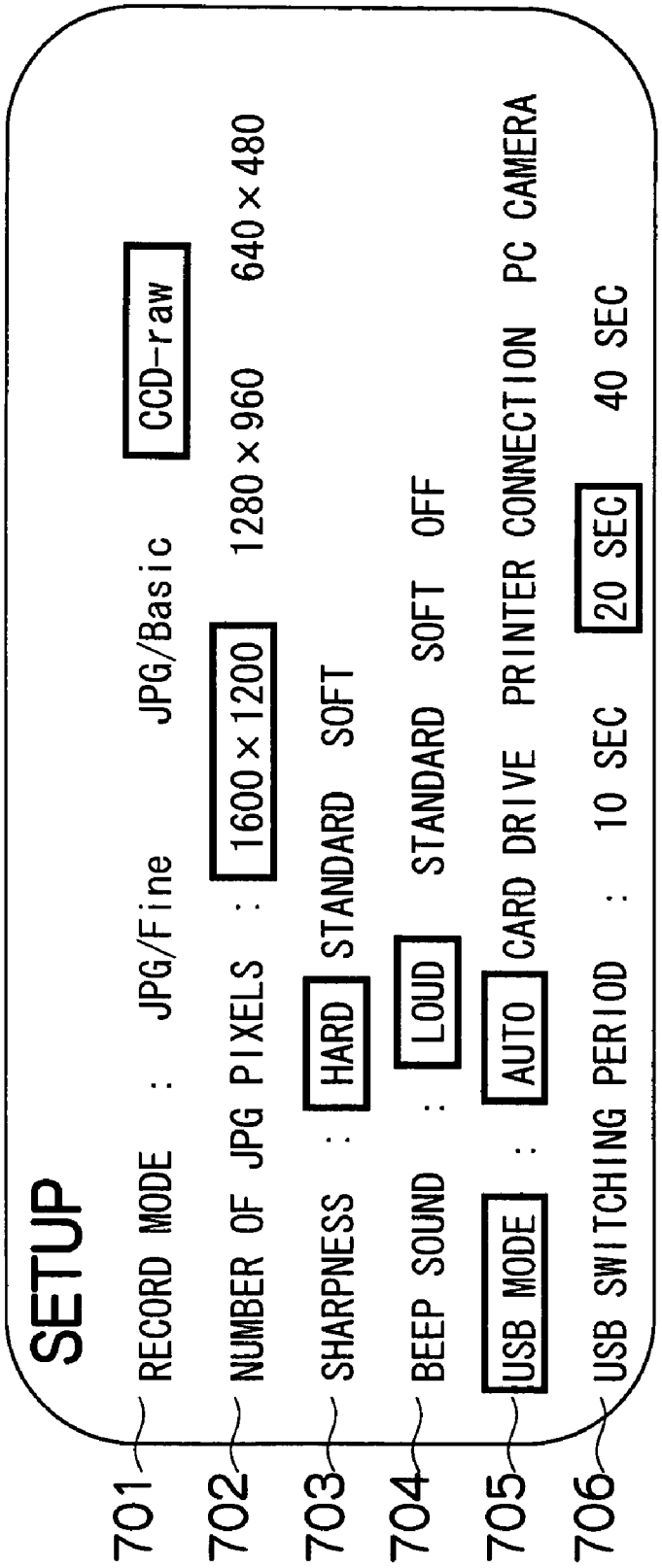
FIG. 7 is a diagram showing a setup screen.

FIG. 7 shows an example of a setup screen 700 displayed on the LCD 121. The setup screen 700 is displayed when the setup mode has been set using the mode dial 1223.

The setup screen 700 enables the setting of a JPEG mode (JPG/FINE mode or JPG/Basic mode) that allows images to be recorded while being compressed on the basis of the JPEG standard, as a recording mode 701 that allows images to be recorded in the memory card 130, or enables the setting of a non-compression mode (CCD-raw mode) that allows images to be recorded without being compressed. As the number of pixels 702 used to record an image in the memory card 130 while compressing the image on the basis of the JPEG standard, it is possible to select one of 1,600×1,200 pixels, 1,280× 960 pixels, and 640×480 pixels. Further, one of hard, standard, and soft can be set as the sharpness 703 of the image. One of loud, standard, soft, and off can be set as a beep sound 704.

A USB mode 705 shows a manner of selecting a descriptor to be transmitted to the USB host. If "AUTO" (descriptor automatic switching mode) is set, the CPU 101 selects and switches the USB descriptor to be transmitted to the USB host. That is, the CPU 101 selects a USB descriptor to be transmitted to the USB host, from a USB descriptor list 600 shown in FIG. 6. If "CARD DRIVE" is set, a USB descriptor 601 corresponding to the mass storage class is fixed. Specifically, the descriptor 601, expressing the function of the mass storage class, is fixedly set in the USB function driver 142. If "PRINTER CONNECTION" is set, a USB descriptor 602 corresponding to the still image class is set. Specifically, the descriptor 602, expressing the function of the still image class, is fixedly set in the USB function driver 142. If "PC CAMERA" is set, a USB descriptor corresponding to a function to transfer images to the PC 20 in real time is set. Specifically, the descriptor 603, expressing the "PC CAMERA", is fixedly set in the USB function driver 142.

Further, in a USB switching period 706, if "AUTO" is set in the USB mode 705, it is possible to set a period for the switching of the USB descriptor carried out by the CPU 101. In other words, it is possible to set the amount of time (seconds) after which the timer 105 times out.

An example of a communication protocol architecture used if the camera 10 functions as the still image class is PictBridge (CIPA-DC-001-2203) devised by CIPA (Camera & Imaging Products Association). In this communication protocol architecture, PTP (Picture Transfer Protocol) is used as a communication protocol for a transport layer on a USB physical layer. A DPS (Direct Print System) layer that is a conversion layer is provided between the transport layer with the PTP (PTP transport layer) and an application layer for DPS (Direct Print System) (DPS application layer).

Such a communication protocol architecture can be implemented in various manners. For example, the application layer, the DPS layer, and the transport layer are composed of the CPU 101.

With reference to the flow chart in FIG. 9, description will be given of operations of the camera 10 according to the present embodiment. The steps in the flow chart are executed in accordance with a program pre-stored in the ROM of the system memory 102, under the control of CPU 101.

As shown in FIG. 6, the descriptor list 600 includes the descriptor 601 for the mass storage class having a function number "1", the descriptor 602 for the still image class having a function number "2", and the descriptor 603 for the PC camera having a function number "3" (vender-unique function); the three descriptors 601, 602, and 603, supported by the camera 10, are registered in this order. In the setup screen 700 in FIG. 7, the "AUTO" mode is preset as the USB mode 705. In the "AUTO" mode, as will be described in detail, the descriptor to be transmitted to the USB host under the control of the CPU 101 is switched.

Figure 8A:
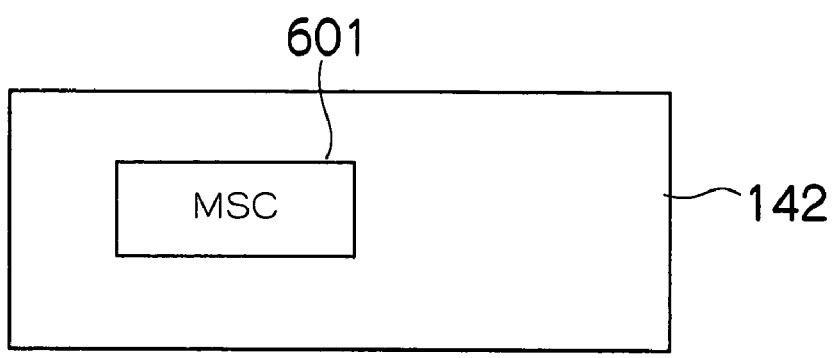
FIGS. 8A and 8B are diagrams illustrating how the descriptor is switched.
Figure 9:
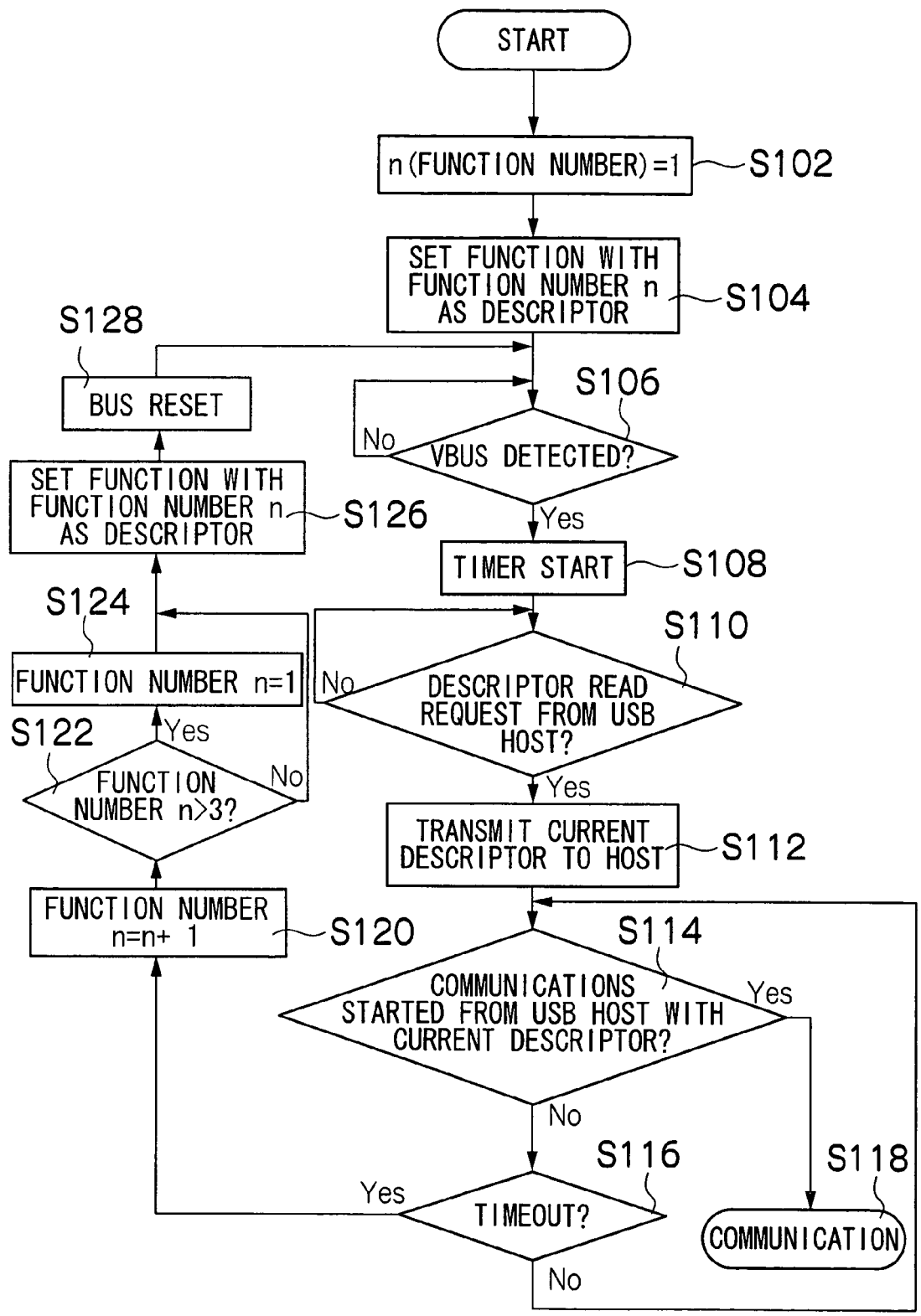
FIG. 9 is a flow chart showing operations of the camera according to the first embodiment of the preset invention.

In FIG. 9, first, the current function number n is initialized to "1" (S102). Then, on the basis of the descriptor list 600 in FIG. 6, the descriptor 601 (mass storage class), having the function number "1", is set in the USB function driver 142 as shown in FIG. 8A (S104). The VBUS detecting section 141 then monitors the VBUS of the USB to detect whether or not the USB host is connected to the USB function device via the USB (S106).

Here, as shown in FIG. 2, it is assumed that one end of the USB cable 40 is connected to the printer 30, while the other end of the USB cable 40 is inserted into the connector 140 of the camera 10. That is, the printer 30 is assumed to be connected to the camera as a USB host. Then, the VBUS detecting section 141 detects that the USB host is connected to the camera 10. The counter of the timer 105 is then cleared to start clocking (S108). At this time, the CPU 101 senses that a certain USB host is connected to the camera 10 via the USB (it is determined in a step described later whether or not the USB host supports the current descriptor). Then, the CPU 101 waits for a descriptor read request from the USB host (S110). Since the printer 30 is connected to the camera 10 as the USB host, the CPU 101 receives a descriptor read request from the printer 30. The CPU 101 then transmits the current descriptor (here, the descriptor 601 for the mass storage class) set in the USB function driver 142, to the USB host (S112). The CPU 101 then determines whether or not the USB host starts communications (S114).

The printer 30 supports the still image class but not the mass storage class. Accordingly, even though the descriptor read requests is responded with the descriptor 601 for the mass storage class, the printer 30 does not start communications. If the USB host thus does not start communications, a timeout is detected in a step (S116) of detecting a timeout in the timer 105. Specifically, the USB host does not start communications in accordance with the current descriptor within a specified time after the connection with the USB host has been detected, so that it is determined that the USB host does not support the current USB descriptor.

Figure 8B:
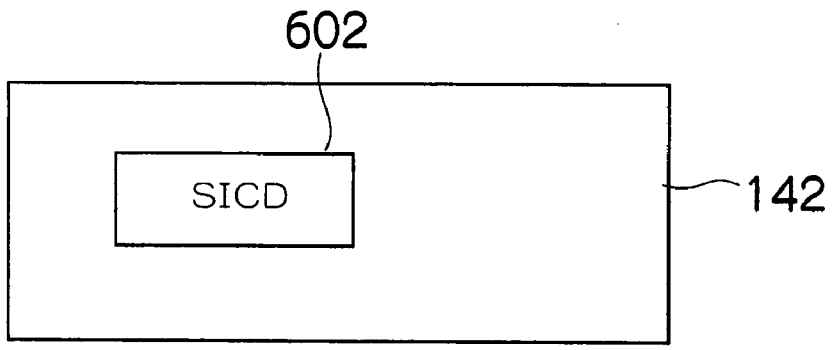

When communications via the USB thus do not start, the current function number n is incremented (S120). It is then determined whether or not the current function number n exceeds a maximum value (in this case, "3") (S122). Since the incremented current function number n is "2", a step (S124) of circularly reinitializing the current function number n to the default "1" is skipped. Further, the descriptor 602 (still image class), having the function number "2", is set in the USB function driver 142 as shown in FIG. 8B (S126). Then, the bus reset generating section 143 generates a bus reset required to initialize communications with the USB host via the USB (S128).

Then, since the printer 30 is already connected to the camera as a USB host as shown in FIG. 2, the VBUS detecting section 141 immediately detects the connection with the USB host (S106). The timer 105 then starts clocking (S108). Then, the CPU 101 receives a descriptor read request from the printer 30 (S110). As a response, the CPU 101 transmits the current descriptor (here, the descriptor 602 for the still image class) set in the USB function driver 142, to the USB host. Since the printer 30 corresponds to the still image class, the printer 30 starts communications in accordance with the descriptor 602 for the still image class (S114). In this manner, the USB host starts communications in accordance with the current descriptor within a specified time after the bus reset. It is thus determined that the USB host supports the current USB descriptor (the descriptor 602 for the still image class). Then, a predetermined communication process is executed (S118). Specifically, in accordance with an operation on the user interface (LCD 121 and operation switches 122) of the camera 10, an image in the memory card 130 installed in the memory card slot 131 of the camera 10 is transferred to the printer 30 via the card interface 132, the USB function driver 142, the connector 140, and the USB cable 40. The printer 30 then prints the transferred image. That is, direct printing is executed.

To eliminate the possibility that the USB host starts communications after the timeout is detected in the step S116 and before the bus reset is generated (S128), it is desirable to avoid responding to the start of communications carried out by the USB host, after the timeout.

In the above description, the printer 30 is connected to the camera as a USB host as shown in FIG. 2 in order to execute direct printing.

In the description below, the PC 20 is connected to the camera as a USB host as shown in FIG. 1 and supports the descriptor 601 for the mass storage class.

In FIG. 9, first, the current function number n is initialized to "1" (S102). Then, the descriptor 601 for the mass storage class, having the function number "1", is set in the USB function driver 142 (S104). When the PC 20 is connected to the camera as shown in FIG. 2, the VBUS detecting section 141 detects that the USB host is connected to the camera (S106). At this time, the timer 105 starts clocking (S108). The CPU 101 then waits for a descriptor read request from the USB host (S110). The CPU 101 then receives a descriptor read request from the PC 20 and thus transmits the descriptor 601 for the mass storage class to the USB host as the current descriptor (S112).

The PC 20 supports the descriptor 601 for the mass storage class and thus starts communications from the PC 20 with the descriptor 601 for the mass storage class (S118). The USB host thus starts communications in accordance with the current descriptor within a specified time after the connection with the USB host has been detected. It is thus determined that the USB host supports the current descriptor (the descriptor 601 for the mass storage class). Then, a predetermined communication process is executed (S118). Specifically, the camera 10 functions as an external storage device and executes a read or a write on the memory card 130 installed in the memory card slot 131, in accordance with a command from the PC 20.

If the PC 20 connected to the camera as shown in FIG. 1 supports only the descriptor 603 for the PC camera, it does not start communications even if a descriptor read request is responded with a response from the camera 10 (S112) with the descriptor 601 for the mass storage class, having the function number "1", or the descriptor 602 for the still image class, having the function number "2". Consequently, a timeout is detected (S116) a specified time after the detection of the connection with the host (S106) or after the bus reset (S128).

The function number n is incremented to "3" (S120), and the camera 10 responds to the descriptor read request with the descriptor 603 for the PC camera, having the function number "3" (S112). Then, the PC starts communications (S114) and a predetermined communication process is executed (S118). Specifically, an image photographed by the image pickup section 111 is transferred to the PC 20 via the signal processing section 112, AD converting section 113, system memory 102, USB function driver 142, connector 140, and USB cable 40 in real time.

Even if communications are not started with any of the descriptors from the descriptor list 600, the function number n is re-initialized to the default "1" (S124) and a retrial is carried out by circularly switching the USB descriptor until the USB host apparatus starts communications in accordance with the current USB descriptor, that is, until the current descriptor matches the USB descriptor expected by the USB host. The number of reinitializations (S124) of the function number n, that is, the number of retrials, is counted to end the process of automatically switching the descriptor if a predetermined threshold (for example, two) is exceeded.

If in the setup screen 700 in FIG. 7, one of the "card drive" mode, "printer connection" mode, and "PC camera" mode is set as the USB mode 705, automatic switching of the USB descriptor such as that shown in FIG. 9 is not carried out. A descriptor read request from the USB host is responded with a fixed USB descriptor from the camera 10. In the "card drive" mode, the USB descriptor 601 for the mass storage class is set in the USB function driver 142. The descriptor read request is responded with the USB descriptor 601 for the mass storage class. In the "printer connection" mode, the USB descriptor 602 for the still image class is set in the USB function driver 142. The descriptor read request is responded with the USB descriptor 602 for the still image class. In the "PC camera" mode, the USB descriptor 603 for the PC camera is set in the USB function driver 142. The descriptor read request is responded with the USB descriptor 603 for the PC camera.

Second Embodiment

In a second embodiment, unlike the first embodiment, the CPU 101 allows the timer 105 to start clocking when the USB function driver 142 detects a descriptor read request from the USB host. Upon detecting a timeout, the CPU 101 switches the current USB descriptor set in the USB function driver 142.

With reference to the flow chart in FIG. 10, description will be given of operations of the camera 10 according to the present embodiment.

In the description below, the three USB descriptors 601, 602, and 603 are pre-registered in the USB descriptor list 600 as shown in FIG. 6, and in the setup screen 700 in FIG. 7, the "AUTO" mode is preset.

Figure 10:
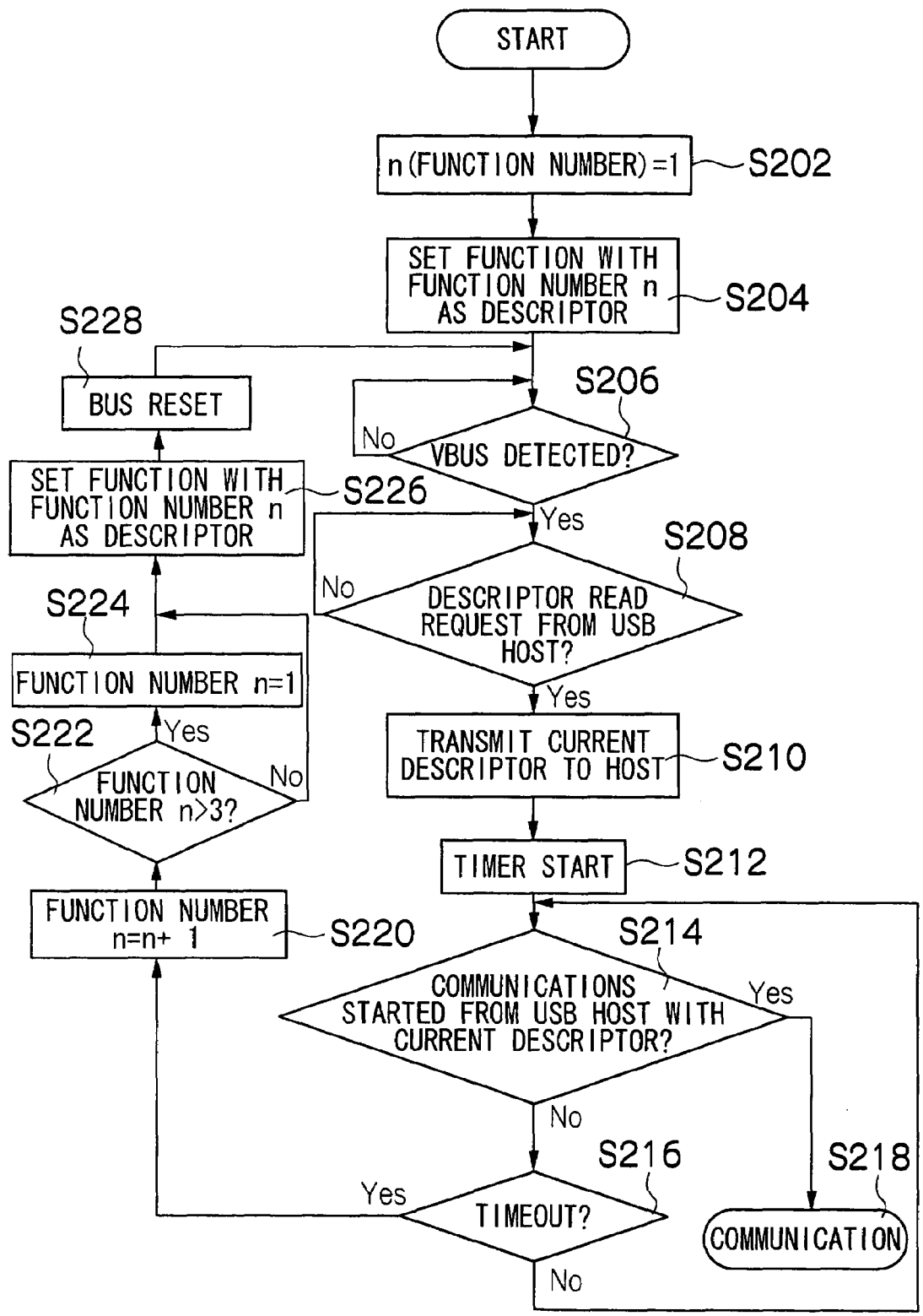
FIG. 10 is a flow chart showing operations of the camera according to a second embodiment of the preset invention.

In FIG. 10, first, the current function number n is initialized to "1" (S202). Then, on the basis of the descriptor list 600 in FIG. 6, the descriptor 601 (the mass storage class), having the function number "1", is set in the USB function driver 142 as shown in FIG. 8A (S204). Then, the VBUS detecting section 141 monitors the VBUS of the USB to detect that the USB host is connected to the camera via the USB (S206).

Here, the printer 30 is assumed to be connected to the camera as a USB host as shown in FIG. 2. Then, the VBUS detecting section 141 detects that the USB host is connected to the camera. The CPU 101 then waits for a descriptor read request from the USB host (S208). Since the printer 30 is connected to the camera as the USB host, the CPU 101 receives a descriptor read request from the printer 30. The CPU 101 then transmits the current descriptor (here, the descriptor 601 for the mass storage class) set in the USB function driver 142, to the USB host (S210). At the same time, the timer 105 starts clocking (S212). The CPU 101 then senses that a certain USB host is connected to the camera via the USB (the CPU 101 determines in a step described later whether or not the USB host supports the current descriptor). The CPU 101 then determines whether or not the USB host starts communications (S214).

The printer 30 supports the still image class but not the mass storage class. Accordingly, even though the descriptor read requests is responded with the descriptor 601 for the mass storage class, the printer 30 does not start communications. If the USB host thus does not start communications, a timeout is detected in a step (S216) of detecting a timeout in the timer 105. Specifically, the USB host does not start communications in accordance with the current descriptor within a specified time after the descriptor read request from the USB host has been detected, so that it is determined that the USB host does not support the current USB descriptor. When communications via the USB thus do not start, the current function number n is incremented (S220). It is then determined whether or not the current function number n exceeds a maximum value (in this case, "3") (S222). Since the incremented current function number n is "2", a step (S224) of circularly reinitializing the current function number n to the default "1" is skipped. Further, the descriptor 602 (still image class), having the function number "2", is set in the USB function driver 142 as shown in FIG. 8B (S226). Then, the bus reset generating section 143 generates a bus reset required to initialize communications with the USB host via the USB (S228). Then, the VBUS detecting section 141 immediately detects the connection with the USB host (S206). The CPU 101 then receives a descriptor read request from the printer 30 (S208). As a response, the CPU 101 transmits the current descriptor (here, the descriptor 602 for the still image class) set in the USB function driver 142, to the USB host. The timer 105 then starts clocking (S210). Since the printer 30 corresponds to the still image class, the printer 30 starts communications in accordance with the descriptor 602 for the still image class (S214). In this manner, the USB host starts communications in accordance with the current descriptor within a specified time after the detection of the descriptor read request. It is thus determined that the USB host supports the current USB descriptor (the descriptor 602 for the still image class). Then, a predetermined communication process is executed (S218). That is, direct printing is executed.

In the description above, the printer 30 is connected to the camera as a USB host as shown in FIG. 2 in order to execute direct printing.

In the first and second embodiment, only one descriptor is set in the USB function driver 142 as described with reference to FIG. 8A and 8B. However, a plurality of descriptors may be set in the USB function driver 142 so that the USB function driver 142 can switch the descriptor.

Figure 11A:
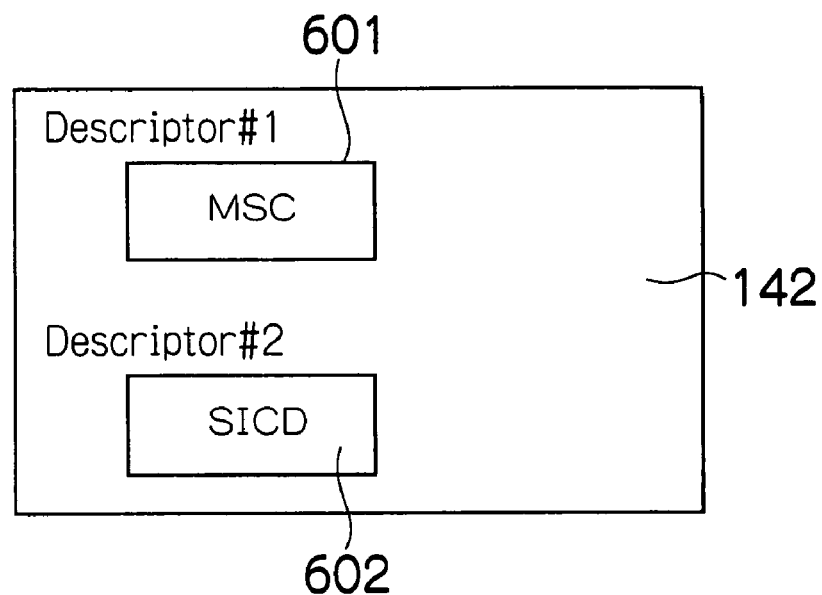
FIGS. 11A and 11B are diagrams illustrating how priorities for a plurality of USB descriptors are changed.

For example, as shown in FIG. 11A, the descriptor 601 for the mass storage class and the descriptor 602 for the still image class are set in the USB function driver 142 as descriptors with the first and second priorities, respectively. Upon receiving the plurality of prioritized descriptors 601 and 602, the USB function driver 142 switches the descriptor to be transmitted to the USB host as a response to a descriptor read request. Specifically, when the USB host does not start communications and a timeout occurs even though a description read request from the USB host has been responded with the descriptor 601 with the first priority, the USB function driver 142 switches to the descriptor 602 with the second priority to generate a bus reset. Then, after the bus reset, the descriptor read request is responded with the descriptor 602 with the second priority.

Alternately, the user interface (LCD 121 and operation switches 122) may be used to allow the priorities of the descriptors to be set.

Figure 11B:
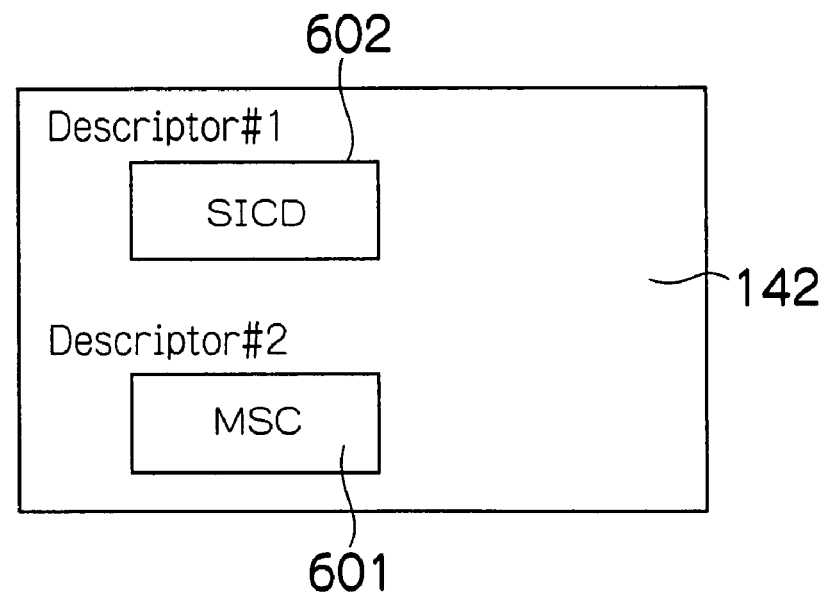

For example, in FIG. 11A, the first priority belongs to the descriptor 601 for the mass storage class. The second priority belongs to the descriptor 602 for the still image class. However, when the user interface (121 and 122) is used to input an instruction on a change in priorities, the first priority is switched to the descriptor 602 for the still image class and the second priority is switched to the descriptor 601 for the mass storage class as shown in FIG. 11B. The priority information is stored in a nonvolatile memory 104. When the camera 10 is activated and if the nonvolatile memory 104 contains priority information, the CPU 101 sets the plurality of descriptors having the priorities in the USB function driver 142 on the basis of the priority information in the nonvolatile memory 104.

In the above description, the USB function driver according to the present invention is applied to the camera. However, the present invention is not limited to this aspect. Of course, the present invention is applicable to other USB function apparatuses. For example, the present invention may be applied to, for example, a storage device that stores data such as images or a printer that can print images or the like.

Further, the manner of the USB connection with the USB host apparatus is not limited to the use of a cable. For example, a connector of the USB host may be connected directly to a connector of the USB function.

Furthermore, in the above description, the USB descriptors describe the mass storage class, the still image class, and the PC camera. However, these are only examples.

What is claimed is:

1. A USB function apparatus which supports a plurality of USB descriptors and which is connected to a host apparatus via a USB to operate as a USB function, the
   USB function apparatus comprising:
   a descriptor switching device which switches between one of said plurality of USB descriptors to be transmitted to said host apparatus;
   a bus reset generating device which generates a bus reset to initialize communications with said host apparatus; and
   a control device which:
   (a) sends a current USB descriptor to said host apparatus in response to a descriptor request from said host apparatus;
   (b) determines whether said host apparatus has responded to the current USB descriptor by communicating with the USB function apparatus in accordance with the current USB descriptor;
   wherein if the control device determines that the host apparatus has not responded to the current USB descriptor by communicating with the USB function apparatus, the control device further
   (c) causes said descriptor switching device to switch the current USB descriptor to a different one of the plurality of USB descriptors; and
   (d) causes said bus reset generating device to generate a bus reset;
   a host connection detecting device which detects that said host apparatus is connected to the USB function apparatus via said USB; and
   a timer which starts clocking when said host connection detecting device detects that said host apparatus is connected to the USB function apparatus or when said bus reset generating device generates a bus reset, and
   wherein when said host apparatus does not respond to the current USB descriptor by communication with the USB function apparatus in accordance with the current USB descriptor within a predetermined time after a detection of the connection with said host apparatus or after the generation of a bus reset, said control device causes the descriptor switching device to switch the current USB descriptor to a different one of the plurality of USB descriptors and causes the bus reset generating device to generate a bus reset.

2. A USB function apparatus which supports a plurality of USB descriptors and which is connected to a host apparatus via a USB to operate as a USB function, the USB function apparatus comprising:
   a descriptor switching device which switches between one of said plurality of USB descriptors to be transmitted to said host apparatus;
   a bus reset generating device which generates a bus reset to initialize communications with said host apparatus;
   a control device which:
   (a) sends a current USB descriptor to said host apparatus in response to a descriptor request from said host apparatus;
   (b) determines whether said host apparatus has responded to the current USB descriptor by communicating;
   with the USB function apparatus in accordance with the current USB descriptor;
   wherein if the control device determines that the host apparatus has not responded to the current USB descriptor by communicating with the USB function apparatus, the control device further
   (c) causes said descriptor switching device to switch the current USB descriptor to a different one of the plurality of USB descriptors; and
   (d) causes said bus reset generating device to generate a bus reset;
   a descriptor request detecting device which detects a USB descriptor request from said host apparatus; and
   a timer which starts clocking when said descriptor request detecting device detects the descriptor request from said host apparatus, and
   wherein when said host apparatus does not respond to the current USB descriptor by communicating with the USB function apparatus in accordance with the current USB descriptor within a predetermined time after a detection of the descriptor request from said host apparatus, said control device causes the descriptor switching device to switch the USB descriptor and causes the bus reset generating device to generate a bus reset.

3. The USB function apparatus according to claim 1, further comprising a descriptor switching setting device which enables a user to set whether or not to use said descriptor switching device to automatically switch the current USB descriptor.

4. The USB function apparatus according to claim 1, further comprising a descriptor switching setting device which enables a user to set whether or not to use said descriptor switching device to automatically switch the current USB descriptor.

5. The USB function apparatus according to claim 2, further comprising a descriptor switching setting device which enables a user to set whether or not to use said descriptor switching device to automatically switch the current USB descriptor.

6. The USB function apparatus according to claim 1, further comprising a priority setting device which enables a user to set priorities for at least one of the plurality of USB descriptors with respect to an order in which the current USB descriptor is automatically switched to another of the plurality of USB descriptors by said descriptor switching device.

7. The USB function apparatus according to claim 1, further comprising a priority setting device which enables a user to set priorities for at least one of the plurality of USB descriptors with respect to an order in which the current USB descriptor is automatically switched to another of the plurality of USB descriptors by said descriptor switching device.

8. The USB function apparatus according to claim 2, further comprising a priority setting device which enables a user to set priorities for at least one of the plurality of USB descriptors with respect to an order in which the current USB descriptor is automatically switched to another of the plurality of USB descriptors by said descriptor switching device.

9. The USB function apparatus according to claim 3, further comprising a priority setting device which enables a user to set priorities for at least one of the plurality of USB descriptors with respect to an order in which the current USB descriptor is automatically switched to another of the plurality of USB descriptors by said descriptor switching device.

10. The USB function apparatus according to claim 4, further comprising a priority setting device which enables a user to set priorities for at least one of the plurality of USB descriptors with respect to an order in which the current USB descriptor is automatically switched to another of the plurality of USB descriptors by said descriptor switching device.

11. The USB function apparatus according to claim 5, further comprising a priority setting device which enables a user to set priorities for at least one of the plurality of USB descriptors with respect to an order in which the current USB descriptor is automatically switched to another of the plurality of USB descriptors by said descriptor switching device.

12. The USB function apparatus according to claim 1, wherein the control device repeats (a)-(d) for each of the plurality of USB descriptors until either:
   (i) the control device determines that the host apparatus has responded to the current USB descriptor by communicating with the USB function apparatus; or
   (ii) the descriptor switching device switches the current USB descriptor a predetermined number of times.

13. The USB function apparatus according to claim 1, wherein the control device determines whether or not the host apparatus begins communicating according to a specific class associated with the current USB descriptor.

* * * * *